US012766636B2

(12) United States Patent
Van Der Wiel

(10) Patent No.: US 12,766,636 B2
(45) Date of Patent: Oct. 20, 2026

(54) ELECTRICAL CONTACT BETWEEN SEPARATED SEMICONDUCTOR LAYERS

(71) Applicant: Melexis Technologies NV, Tessenderlo (BE)

(72) Inventor: Appolonius Jacobus Van Der Wiel, Tessenderlo (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 927 days.

(21) Appl. No.: 18/062,706

(22) Filed: Dec. 7, 2022

(65) Prior Publication Data

US 2023/0173613 A1 Jun. 8, 2023

(30) Foreign Application Priority Data

Dec. 8, 2021 (EP) .................................... 21212998

(51) Int. Cl.

| | |
|---|---|
| ***B23K 26/364*** | (2014.01) |
| ***B23K 26/38*** | (2014.01) |
| ***B23K 26/40*** | (2014.01) |
| *B23K 101/40* | (2006.01) |
| *B23K 103/00* | (2006.01) |
| *B23K 103/16* | (2006.01) |

(52) U.S. Cl.

CPC ............ *B23K 26/364* (2015.10); *B23K 26/38* (2013.01); *B23K 26/40* (2013.01); *B23K 2101/40* (2018.08); *B23K 2103/172* (2018.08); *B23K 2103/56* (2018.08)

(58) Field of Classification Search

CPC .......... B23K 2103/172; B23K 2101/40; B23K 2103/56; B23K 26/40; B23K 26/38; B23K 26/364

USPC ...................................................... 219/121.72

See application file for complete search history.

(56) References Cited

U.S. PATENT DOCUMENTS 5,708,252 A * 1/1998 Shinohara ............ B23K 26/364 219/121.73
8,993,924 B2 * 3/2015 Ryu ................... B23K 26/0736 219/121.72
9,130,057 B1 * 9/2015 Kumar .................... H01L 21/78

(Continued)

FOREIGN PATENT DOCUMENTS

JP 2019110272 A * 7/2019 ........... H01L 21/301
WO WO-2015140849 A1 * 9/2015 ............. H10H 20/01

OTHER PUBLICATIONS

European Search Report from corresponding European Patent Application No. EP 21212998.5, Jun. 1, 2022.

*Primary Examiner* — Jimmy Chou

(74) *Attorney, Agent, or Firm* — Workman Nydegger

(57) ABSTRACT

A method for creating an electrical contact between semiconductor layers which are separated by an isolating connection layer. The method comprising: providing a layered stack comprising at least a first semiconductor layer, an isolating connection layer, and a second semiconductor layer, wherein the isolating connection layer is between first semiconductor layer and the second semiconductor layer; laser grooving at least one laser groove in the stack through the first semiconductor layer and the isolating connection layer and partly in the second semiconductor layer, leaving a remainder of the second semiconductor layer; cutting the remainder of the second semiconductor layer.

10 Claims, 5 Drawing Sheets

(56) References Cited

U.S. PATENT DOCUMENTS

| | | | | |
|---|---|---|---|---|
| 2005/0186760 | A1* | 8/2005 | Hashimura | B23K 26/18<br>438/460 |
| 2007/0123061 | A1* | 5/2007 | Evertsen | H01L 21/30617<br>438/795 |
| 2008/0200007 | A1* | 8/2008 | Lim | H01L 21/76229<br>438/430 |
| 2009/0191693 | A1* | 7/2009 | Lizuka | H01L 21/78<br>257/E21.349 |
| 2010/0120228 | A1* | 5/2010 | Saito | B23K 26/364<br>438/584 |
| 2011/0186554 | A1* | 8/2011 | Koyanagi | B23K 26/40<br>219/121.72 |
| 2013/0298744 | A1* | 11/2013 | Kumazawa | B23K 26/60<br>219/121.68 |
| 2015/0371905 | A1 | 12/2015 | Carroll et al. | |
| 2016/0184934 | A1* | 6/2016 | Matsumoto | B23K 26/70<br>219/121.72 |
| 2017/0043431 | A1* | 2/2017 | Kuba | B23K 26/032 |
| 2017/0265308 | A1* | 9/2017 | Nemeth | B23K 26/402 |
| 2018/0197777 | A1* | 7/2018 | Karasaki | H01L 21/02076 |
| 2019/0084088 | A1* | 3/2019 | Takei | C23C 14/048 |
| 2019/0279902 | A1* | 9/2019 | Park | B23K 26/0622 |
| 2019/0304838 | A1* | 10/2019 | Saeki | H01L 21/30655 |
| 2021/0069926 | A1 | 3/2021 | Fuji et al. | |
| 2021/0407855 | A1* | 12/2021 | Saeki | H01L 21/68721 |
| 2022/0402072 | A1* | 12/2022 | Saeki | H01L 21/3065 |
| 2023/0115673 | A1* | 4/2023 | Soltani | B23K 26/402<br>219/121.72 |
| 2023/0264292 | A1* | 8/2023 | Aikawa | B23K 26/0676<br>219/121.72 |

* cited by examiner

ELECTRICAL CONTACT BETWEEN SEPARATED SEMICONDUCTOR LAYERS

FIELD OF THE INVENTION

The invention relates to the field of semiconductor devices. More specifically it relates to a method for creating an electrical contact between semiconductor layers which are separated by an isolating layer, which is providing a physical connection between the semiconductor layers. The invention also relates to a device obtained using such a method.

BACKGROUND OF THE INVENTION

Semiconductor devices, such as for example pressure sensors, are preferably stable over time. One factor which affects the stability is the drift of the semiconductor device. It is found that semiconductor devices show more drift when the active surface is electrically isolated from the substrate.

In the examples below semiconductor devices with different structures are tested. A structure where a membrane wafer is formed by an epitaxial (EPI) wafer; a structure where a membrane wafer is bonded to the bulk wafer using fusion bonding; a silicon-on-insulator (SOI) structure.

A comparative test was carried out with pressure sensors where a first group had no buried oxide between the active surface and the substrate and a second group was fabricated with such a layer. Significantly more drift was observed for the parts with the buried oxide layer after a biased high temperature storage test. Recently sensors made with SOI wafers and with EPI wafers were compared. They had exactly the same process and layout at the front side. However after 1000 hours at high-temperature operating life (HTOL) at 150° C. the sensors built from SOI wafers showed more drift than the ones built from EPI wafers.

Another comparative test showed that drift caused by surface charges was 3 times higher for devices with a buried oxide layer.

Many complementary metal oxide semiconductor (CMOS) devices built on SOI wafers have a contact from substrate to the top layer at the periphery of the device to assure that the bulk is always kept at GND by a contact to the sealring through the buried oxide.

In both cases the membrane formed by an EPI layer performs better. The difference between an EPI wafer and the other wafers is that in case of an EPI wafer there is a contact through the junction between the EPI layer and bulk whereas in the other wafers the buried oxide of the SOI wafer isolates the membrane from the bulk. In case of the buried oxide, this oxide, which is always present between the membrane wafer and bulk wafer during fusion bonding, isolates the membrane from the bulk.

A contact between substrate layer and top layer improves the stability of the semiconductor. However, it is cumbersome to create such a contact as it extends the fabrication process and increases production cycle time and therefore significantly increases the production costs.

When for example forming a layer stack using fusion bonding, there is always an oxide layer formed between the membrane wafer and the bulk wafer. This oxide layer can for example have a thickness of 4 nm. As a consequence one has to bridge this oxide with an ohmic contact with the membrane (up to 22 μm or even 45 μm thick). A straight forward way would be to create such a contact with the following extra steps:

extra step: DRIE etch of slits or holes with a 3 μm diameter of 17 to 24 μm; deep that go to 2 μm into bulk silicon (extra photo step);

extra step: sputter TiW contact layer (no patterning);

extra step: remove TiW from surface only with deep reactive ion etching (DRIE);

poly deposition with As implant as in existing process flow;

extra step: oxide fill remaining of slits or holes;

extra step: Remove oxide from surface only with DRIE;

pattern poly silicon and continue existing process flow.

The process described above contains some complex process steps that are not trivial. Therefore process development and production cost will be significant and unwanted.

There is therefore a need for methods which allow creating an electrical contact between semiconductor layers which are separated by an isolating connection layer and for semiconductor devices with an electrical contact between semiconductor layers which are separated by an isolating connection layer.

SUMMARY OF THE INVENTION

It is an object of embodiments of the present invention to provide a good method for creating an electrical contact between semiconductor layers which are separated by an isolating connection layer and to provide good semiconductor devices with an electrical contact between semiconductor layers which are separated by an isolating connection layer.

The above objective is accomplished by a method and device according to the present invention.

In a first aspect embodiments of the present invention relate to a method for creating an electrical contact between semiconductor layers which are separated by an isolating connection layer.

The method comprises providing a layered stack which comprises at least a first semiconductor layer, an isolating connection layer, and a second semiconductor layer. The isolating connection layer is between the first semiconductor layer and the second semiconductor layer.

The method, moreover, comprises laser grooving at least one laser groove in the stack through the first semiconductor layer and the isolating connection layer and partly in the second semiconductor layer, leaving a remainder of the second semiconductor layer. After the laser grooving a recrystallized conductive layer is obtained at an edge of the layered stack, which connects the first semiconductor layer and the second semiconductor layer. This recrystallized conductive layer is at least obtained from molten material of the first semiconductor layer.

The method, moreover, comprises cutting the remainder of the second semiconductor layer.

It is an advantage of embodiments of the present invention that the side walls of the at least one groove is molten by the laser, thus forming a recrystallized conductive layer over the isolating connection layer. By partly laser grooving in the second semiconductor layer, the obtained conductive material can bridge the oxide.

It is an advantage of embodiments of the present invention that the laser grooving does not completely goes through the second semiconductor layer (e.g. the bulk layer) as this would result in an excess of ablated bulk material on top of the top layer.

It is an advantage of embodiments of the present invention that the electrical contact between the first and the second semiconductor layer can be obtained without the use of photolithography.

It is an advantage of embodiments of the present invention that performing the laser grooving as part of the die singulation process minimizes the cost for this process and enhances the quality of the sawing at the same time. Furthermore, the contact resistance is optimized as the contact is formed all along the edge of the device.

In embodiments of the present invention the focal point of the laser is controlled during the laser grooving. In embodiments of the present invention the focal point of the laser during the laser grooving is controlled such that it is substantially at the level of the isolating connection layer.

In embodiments of the present invention the first and second semiconductor layer of the provided layered stack are silicon layers, GaAs layers, SiC layers, GaN layers or a combination thereof.

In embodiments of the present invention the method comprises doping the bonding surface of the first and/or the second semiconductor layer with an n-type or p-type dopant.

In embodiments of the present invention a thickness of the isolation connection layer of the provided layer stack is between 3 and 6 nm. In embodiments of the present invention the isolation connection layer may even have a thickness up to 2000 nm (e.g. in case of an oxide layer of a SOI wafer).

In embodiments of the present invention adjacent laser grooves are lasered in the stack and cutting the remainder of the second semiconductor layer is done between the adjacent laser grooves.

In embodiments of the present invention the laser grooving of the adjacent laser grooves is done such that in a pair of adjacent laser grooves the adjacent laser grooves are parallel.

In embodiments of the present invention the laser grooving is done in at least two passes. It is an advantage of embodiments of the present invention that the required depth (i.e. a groove with a depth such that it at least cuts through the isolation connection layer) can be obtained by laser grooving in more than one pass, wherein the depth of the laser grooving in the stack is adjusted for each pass. In embodiments of the present invention laser grooving is done up to substantially a same depth as the depth of the isolating connection layer.

In embodiments of the present invention the laser grooving and the cutting are both done in two different directions to singulate a plurality of semiconductor devices from the layered stack. It is an advantage of embodiments of the present invention that at each edge of the obtained semiconductor device a recrystallized conductive layer is present.

In a second aspect embodiments of the present invention relate to a semiconductor device. The semiconductor device comprises a layered stack of a first semiconductor layer, an isolating connection layer, and a second semiconductor layer. The isolating connection layer is between first semiconductor layer and the second semiconductor layer. The semiconductor device, moreover, comprises a recrystallized conductive layer at an edge of the layered stack, connecting the first semiconductor layer and the second semiconductor layer. The recrystallized conductive layer is at least obtained from molten material of the first semiconductor layer. Additionally it may comprise recrystallized material from the second semiconductor layer.

It is an advantage of a semiconductor device according to embodiments of the present invention that a contact from the first semiconductor layer and the second semiconductor layer (e.g. substrate) is provided as this improves the stability of the semiconductor device.

It is advantage of a semiconductor device according to embodiments of the present invention that the recrystallized conductive layer can be obtained at a reduced cost compared to a device wherein the electrical contact between both layers can only obtained through photolithography masks.

In embodiments of the present invention the first semiconductor layer is a silicon layer, and the isolating connection layer is a silicon oxide layer, and the second semiconductor layer is a bulk silicon layer.

In embodiments of the present invention the device is a sensor wherein the first semiconductor layer forms a membrane of the sensor. The sensor may for example be a pressure sensor. It is an advantage of embodiments of the present invention that the drift of the sensor is reduced by electrically connecting the first semiconductor layer with the second semiconductor layer.

In embodiments of the present invention the device comprises a CMOS or BICMOS circuit in the first semiconductor layer.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
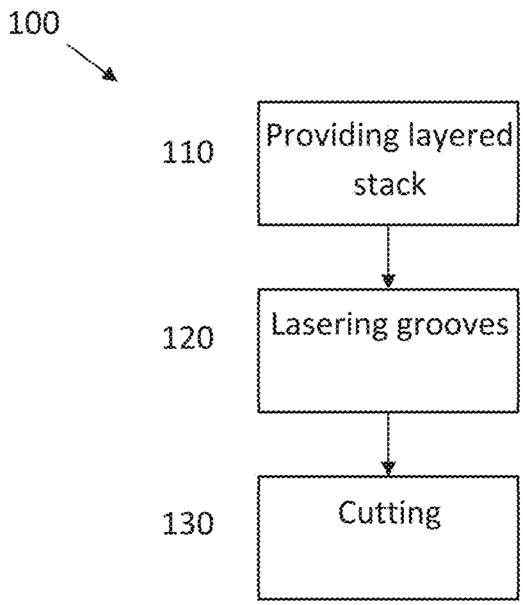
FIG. 1 shows a flow chart of an exemplary method in accordance with embodiments of the present invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect embodiments of the present invention relate to a method 100 for creating an electrical contact between semiconductor layers 210, 220 which are separated by an isolating connection layer 230.

The method comprises providing 110 a layered stack comprising at least a first semiconductor layer 210, an isolating connection layer 230, and a second semiconductor layer 220. The isolating connection layer 230 is present between the first semiconductor layer 210 and the second semiconductor layer 220. The layer 230 is referred to as a connection layer because it is providing a physical connection between the first and second semiconductor layer. It is an isolating connection layer because it provides electrical isolation between the first and second semiconductor layer.

The method, furthermore, comprises laser grooving 120 at least one laser groove in the stack through the first semiconductor layer 210 and the isolating connection layer 230 and partly in the second semiconductor layer 220, leaving a remainder of the second semiconductor layer, and cutting 130 the remainder of the second semiconductor layer 220. After the laser grooving a recrystallized conductive layer 270 is obtained at an edge of the layered stack, which connects the first semiconductor layer 210 and the second semiconductor layer 220. The recrystallized conductive layer is at least obtained from molten material of the first semiconductor layer 210. In embodiments of the present invention an electrical contact is created between the first and the second semiconductor layer by melting locally the insulating layer (also referred to as the isolating connection layer), by melting part of the second semiconductor layer just below and also melting part of the first semiconductor layer just above the molten insulation layer. In the molten zone the semiconductor layer atoms of the first and second semiconductor layer and the insulation layer atoms will mix, and after solidification the resulting recast material will be conductive as the ratio of isolation layer atoms and semiconductor atoms (e.g. Silicon atoms) in the molten zone is too low to assure insulation after recasting.

FIG. 1 shows a flow chart of an exemplary method in accordance with embodiments of the present invention.

In embodiments of the present invention cutting of the remainder of the second semiconductor layer may be done using conventional methods such as using a saw, by stealth dicing, by etching, by laser ablation. Thus, one or more dies, wherein each die has an electrical contact between the first and second semiconductor layer may be obtained.

Figure 2:
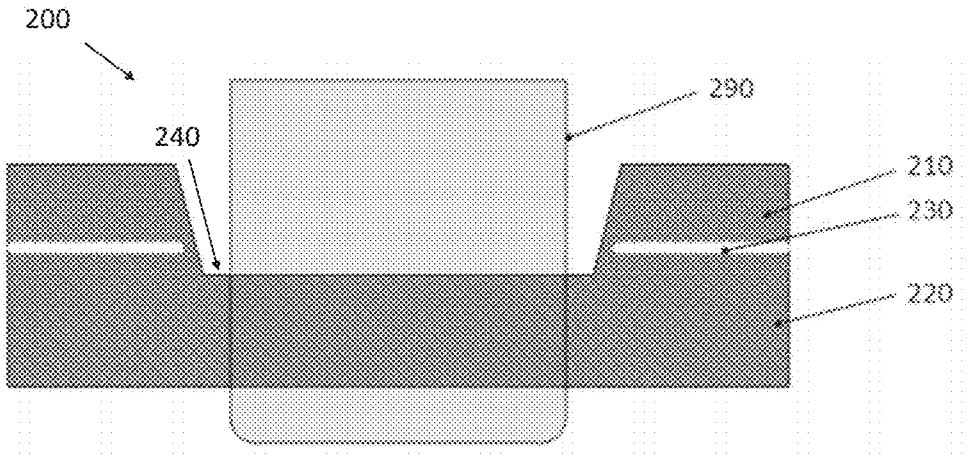
FIG. 2 shows a schematic drawing of a layered stack wherein a groove is obtained through laser grooving and wherein a blade is present for cutting the remainder of the second semiconductor layer in the obtained groove.
Figure 3:
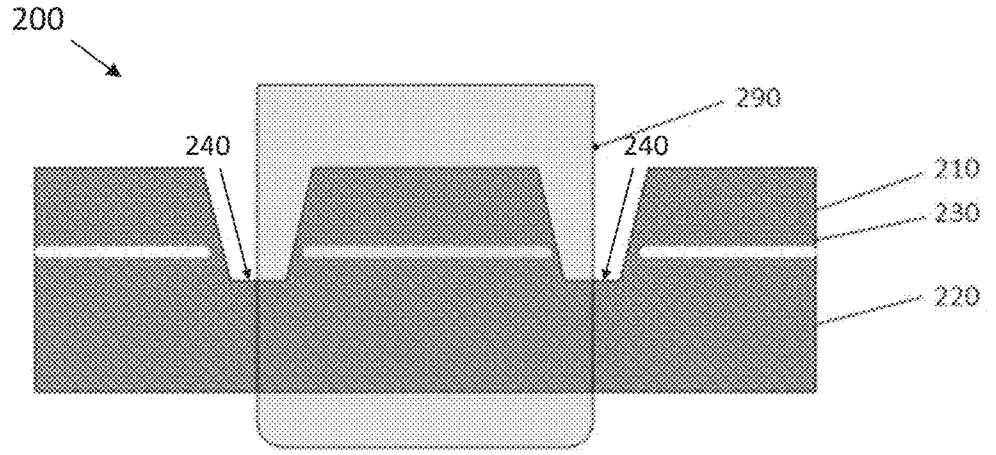
FIG. 3 shows a schematic drawing of a layered stack wherein adjacent grooves obtained through laser grooving are present in the stack and wherein a blade is present for cutting the remainder of the second semiconductor layer between the adjacent grooves.

An example of the cutting with a blade 290 is shown in the schematic drawings of FIG. 2 and FIG. 3. These drawings show a layered stack comprising a first semiconductor layer 210, an isolating connection layer 230, and a second semiconductor layer 220. In FIG. 2 a single groove 210 is present in the stack. In FIG. 3 two adjacent grooves 240 are present in the stack. In both stacks cutting of the remainder of the second semiconductor layer is done using the blade 290.

In embodiments of the present invention the isolating connection layer may for example be an oxide layer (e.g. a buried oxide) such as a silicon-oxide layer or a nitride layer such as a silicon-nitride layer.

In embodiments of the present invention the electrical contact between the first and second semiconductor layer is obtained by the laser grooving. It is demonstrated by the inventor that this is due to that during the laser grooving the side walls of the laser groove are molten and the molten semiconductor material may trickle over the connection layer before recrystallizing during solidification. Thereby, after solidification, a recrystallized conductive layer is obtained that forms a conductive path between the first and second semiconductor layer. For example recrystallized silicon may form the electrical contact between a silicon top layer and a substrate wafer.

The forming of the groove and melting of the side walls is done within one processing step by laser grooving wherein a laser beam locally ablates the first semiconductor layer 210, the isolating connection layer 230 (e.g. a buried oxide layer), and partly the second semiconductor layer 220 (e.g. a substrate wafer) to form a groove. The laser beam melts at the same time the surface of the side walls.

After the laser grooving the dies may be singulated with a (single step) cut with conventional dicing. In such embodiments the laser grooving may be part of the dicing/singulating process. In such embodiments the grooves may follow the scribe lines for the singulation process.

In embodiments of the present invention the bulk-membrane contact is realized all along scribe lines by using laser grooving. By laser grooving, material of the first semiconductor layer, of the isolating connection layer and of part of the second semiconductor layer is ablated.

This may be achieved by controlling the focal point during the laser grooving. In embodiments of the present invention the depth of the focal point from the surface of the first semiconductor layer may be controlled. Additionally also the power of the laser may be controlled. By controlling the focal point, the semiconductor material above and below the isolation layer can be molten using the laser. The power of the laser should be high enough to melt the semiconductor material near the focal point. The molten semiconductor material is then re-cast together to form a bridge over the isolation layer.

In embodiments of the present invention the laser grooving 120 is done in at least two passes to form the required depth for the groove. This may be achieved using a laser that focuses just under the surface of the scribe and moves the focal point along the scribes. The scribe thereby refers to the lane (space) between dies. It has to be wider than the total distance between the outer edges of the groove (FIG. 2) or grooves (FIG. 3). In embodiments of the present invention two or three or more passes may be applied to obtain the required depth to obtain a contact between the first semiconductor layer and the second semiconductor layer (e.g. between the bulk and the membrane).

As described earlier, the dies may be singulated by cutting the remainder of the semiconductor layer after the laser grooving. Performing the laser grooving as part of the wafer singulation process minimizes the cost for this process and enhances wafer singulation by cutting at the same time. In this way the contact resistance is optimized as the contact is formed all along the edge of the device.

The contact across the isolating connection layer (e.g. a 4 nm bonding oxide) will be formed on the walls of the groove when the semiconductor material of the first and second layer melts as the laser beam passes. Thus, in embodiments of the present invention, an electrical contact between the first and second semiconductor layer is created at the edge of the groove. It is therefore an advantage of embodiments of the present invention that, after singulation, an electrical contact is achieved between the first and second semiconductor layer at the edge of the obtained device.

In embodiments of the present invention adjacent laser grooves are lasered 120 in the stack. They may for example be lasered along the scribe lines. Cutting 130 the remainder of the second semiconductor layer is done between the adjacent laser grooves.

In embodiments of the present invention the adjacent laser grooves may be parallel. A distance between the adjacent laser grooves may for example range between 0 and 60 μm.

Laser grooving 120 of laser grooves may be achieved with a laser with a focal width between 5 and 100 μm and with a focal depth between-5 to 5 μm around the connection layer. In this case the depth is expressed relative to the connection layer. The connection layer may for example have a thickness of less than 2 μm and for example even down to 2 nm. In embodiments of the present invention the depth of the focal point may be at substantially the same depth as the connection layer, such that the resulting obtained groove extends partly in the second semiconductor layer. The depth of the focal point determines the depth of the resulting groove. Typically the bottom of the groove is a few μm lower than the middle of the focal point. When laser grooving the hot area that ablates material may have a range of at least 3-5 μm.

In embodiments of the present invention the depth of the focal point may for example be expressed in function of the outer surface of the first semiconductor layer. The depth of the focal point may for example be more than 1 μm, or even more than 5 μm.

With a connection layer at a depth of 10 μm, and a focal point at a same depth of 10 μm, and with a thickness of the connection layer which is significantly smaller than range of the hot area, the focal depth around the connection layer may for example be between −5 to 5 μm.

In embodiments of the present invention further improvement of the contact may be achieved by (maskless) doping the bonding surfaces prior to wafer bonding. In embodiments of the present invention n-type doping is introduced at the bonding surface of the first semiconductor layer and/or at the bonding surface of the second semiconductor layer. These surfaces are facing each other after bonding and then the contact of the electrical connection between bulk and membrane wafer will be improved and also the bulk resistance will be lowered and therefore improved. n-type doping is preferably used for n-type wafers, p-type doping for p-type wafers. Pressure sensors are normally using n-type wafer whereas CMOS wafers are normally p-type wafers.

In a second aspect embodiments of the present invention relate to a semiconductor device 200. The semiconductor device comprises:

a layered stack of a first semiconductor layer 210, an isolating connection layer 230, and a second semiconductor layer 220, wherein the isolating connection layer 230 is between first semiconductor layer 210 and the second semiconductor layer 220;

a recrystallized conductive layer 270 at an edge of the layered stack, connecting the first semiconductor layer 210 and the second semiconductor layer 220, at least obtained from molten material of the first semiconductor layer 210.

It is an advantage of embodiments of the present invention that a substrate contact is provided for semiconductor devices which have a buried oxide between the silicon top layer and the substrate below the buried oxide without the use of photolithography.

In embodiments of the present invention the first semiconductor layer 210 is a silicon layer, and the isolating connection layer 230 is a silicon oxide layer, and the second semiconductor layer 220 is a bulk silicon layer. Typical examples of such semiconductor devices are CMOS devices made out of Silicon On Insulator (SOI) wafers and sensors fabricated by using silicon-to-silicon bonding techniques.

The invention is, however, not limited to silicon semiconductor layers. The first and second semiconductor layers may for example be GaAs layers, SiC layers, GaN layers or a combination thereof.

Figure 4:
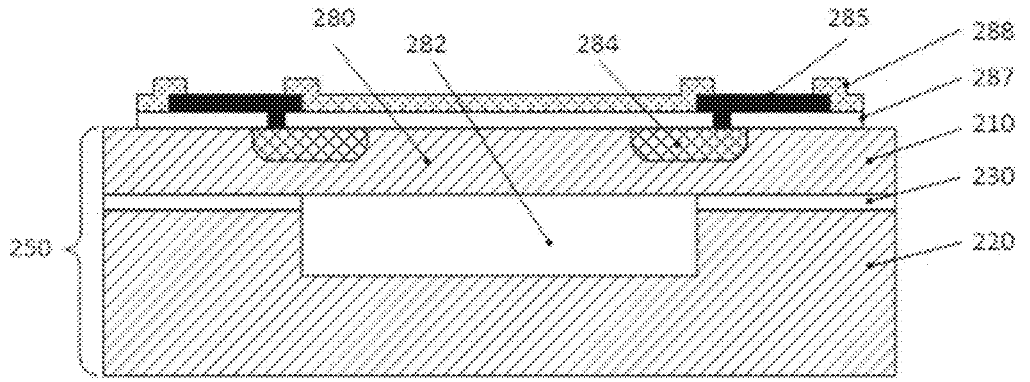
FIG. 4 (prior art)
FIG. 4 shows a schematic drawing of a prior art semiconductor device.

FIG. 4 shows a schematic drawing of a prior art semiconductor device. The device comprises a first semiconductor layer 210 and a second semiconductor layer 220 wherein the first and second semiconductor layer are separated by an isolating connection layer 230 (e.g. an oxide layer).

The figure shows a membrane 280 formed by the first semiconductor layer over a membrane cavity 282 formed in the second semiconductor layer. A first passivation layer 287 is present over the first semiconductor layer. A piezo resistor 284 is formed in the first semiconductor layer and a piezo resistor interconnect and bondpad 285 are present for connecting with the piezo resistor. The piezo resistor interconnect goes through the first passivation layer 287 and the bondpad is applied on the first passivation layer 287. A second passivation layer 288 is applied on top of the first passivation layer 287. There are openings in the second passivation layer for access to the bondpads. In this figure the die edge 250 obtained by conventional singulation is also illustrated.

Figure 5:
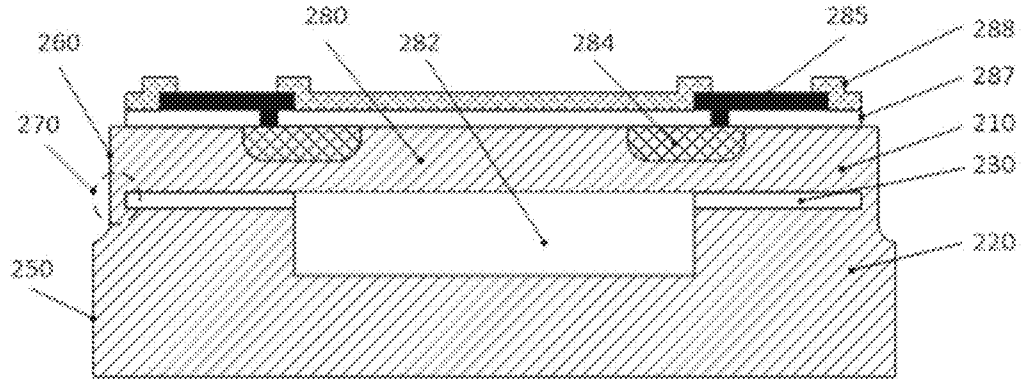
FIG. 5 shows a schematic drawing of a semiconductor device in accordance with embodiments of the present invention.

FIG. 5 shows a schematic drawing of a semiconductor device 200 in accordance with embodiments of the present invention. The stack is similar as the stack of the semiconductor device illustrated in FIG. 4. Also in this example a membrane 280 is formed by the first semiconductor layer over a membrane cavity 282 formed in the second semiconductor layer. The membranes may for example have a thickness ranging between 15 and 22 μm. Also in this figure a first passivation layer 287, a piezo resistor 284, a piezo resistor interconnect and bondpad 285, and a second passivation layer 288 are shown.

The die edge 250 of the semiconductor device illustrated in FIG. 4 is different from the die edge 250, 260, 270 of a semiconductor device according to embodiments of the present invention, illustrated in FIG. 5. In FIG. 5 the upper die edge 260 formed by laser grooving and the recrystallized conductive layer 270 over the isolating connection layer 230 are shown. The cut 250 resulting from cutting 130 the remainder of the semiconductor layer is also visible.

A device according to embodiments of the present invention may be a sensor. The first semiconductor layer may form a membrane of the sensor. The sensor may for example be a pressure sensor. The device may comprise a CMOS or BICMOS circuit in the first semiconductor layer. In such a device transistors are realized in the first semiconductor layer. The first semiconductor layer may be the silicon layer of a Silicon On Insulator wafer.

In embodiments of the present invention a thickness of the isolation layer 230 of the provided 110 layer stack is between 3 and 6 nm. For some devices such as CMOS on SOI the thickness of the isolation layer can be 50 to 200 nm or even 200 to 2000 nm. In embodiments of the present invention the thickness of the first semiconductor layer may range between 0.2 and 50 μm.

Figure 6:
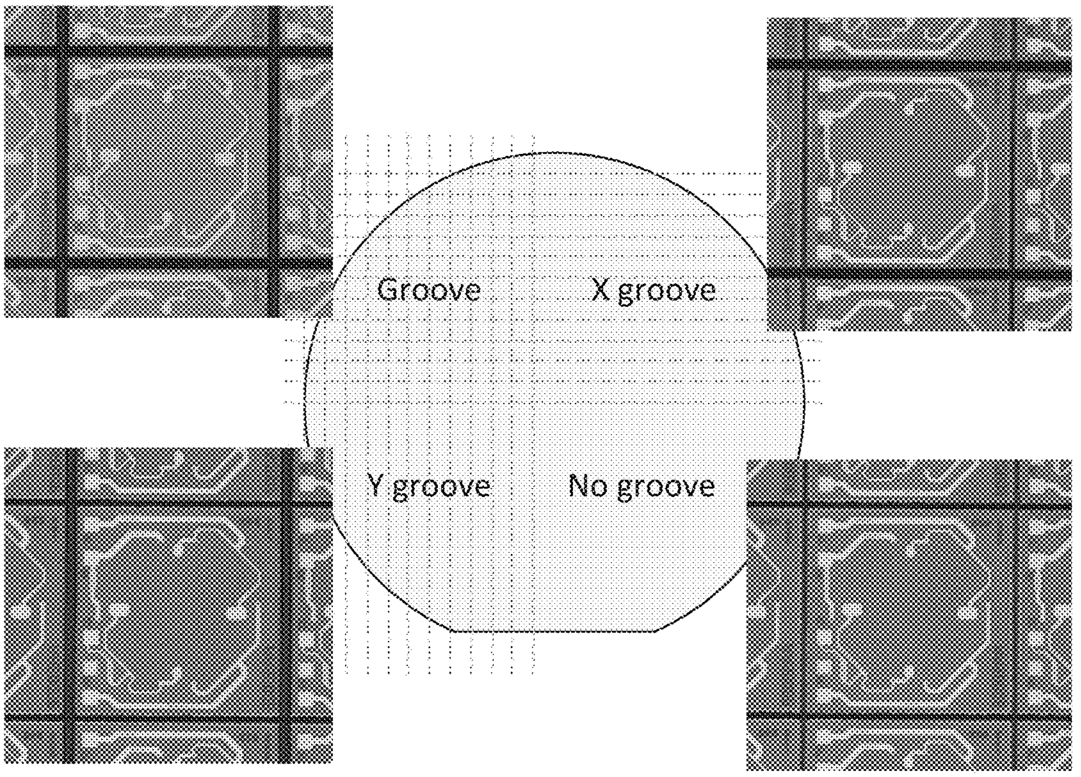
FIG. 6 shows a schematic drawing of a wafer to which grooves are applied in one or more direction, in accordance with embodiments of the present invention.

In embodiments of the present invention laser grooving 120 may be done in one or more directions. The laser grooving 120 and the cutting 130 may for example both be done in two different directions to singulate a plurality of semiconductor devices from the layered stack. An example thereof is illustrated in FIG. 6.

The top left die is obtained by laser grooving and cutting in both the X and Y direction, wherein both directions are orthogonal to each other.

The bottom left die is obtained by laser grooving and cutting in the Y direction and by only cutting in the X direction.

The top right die is obtained by laser grooving and cutting in the X direction and by only cutting in the Y direction.

The bottom right die is obtained by only cutting in both directions. This die is not a semiconductor device according to embodiments of the present invention. The other dies are.

Figure 7:
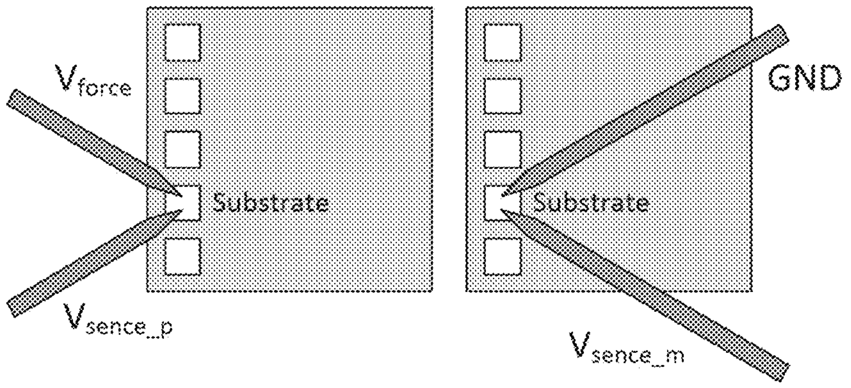
FIG. 7 illustrates how probes may be applied to measure the contact resistance between two adjacent substrate contacts of semiconductor devices in accordance with embodiments of the present invention.

In embodiments of the present invention the contact resistance between two adjacent substrate contacts may be measured as illustrated in FIG. 7. The resistance between the two layers may be measured in an indirect way. Instead of contacting the second semiconductor layer (in this example corresponding with the substrate) directly (at the backside of the dies in FIG. 7) this second semiconductor layer may be contacted through a substrate contact of an adjacent die. To assure that the dies are connected the cut 130 is made deeper than the depth of the groove, but still assuring the wafer is one piece. In this example 4 probes are used. One probe pair is used for applying a voltage difference ($V_{force}$, GND) between the adjacent substrate contacts and for measuring the current ($I_{force}$) through the probes of this pair. Another probe pair is used for measuring the voltage on the adjacent substrate contacts.

Figure 8:
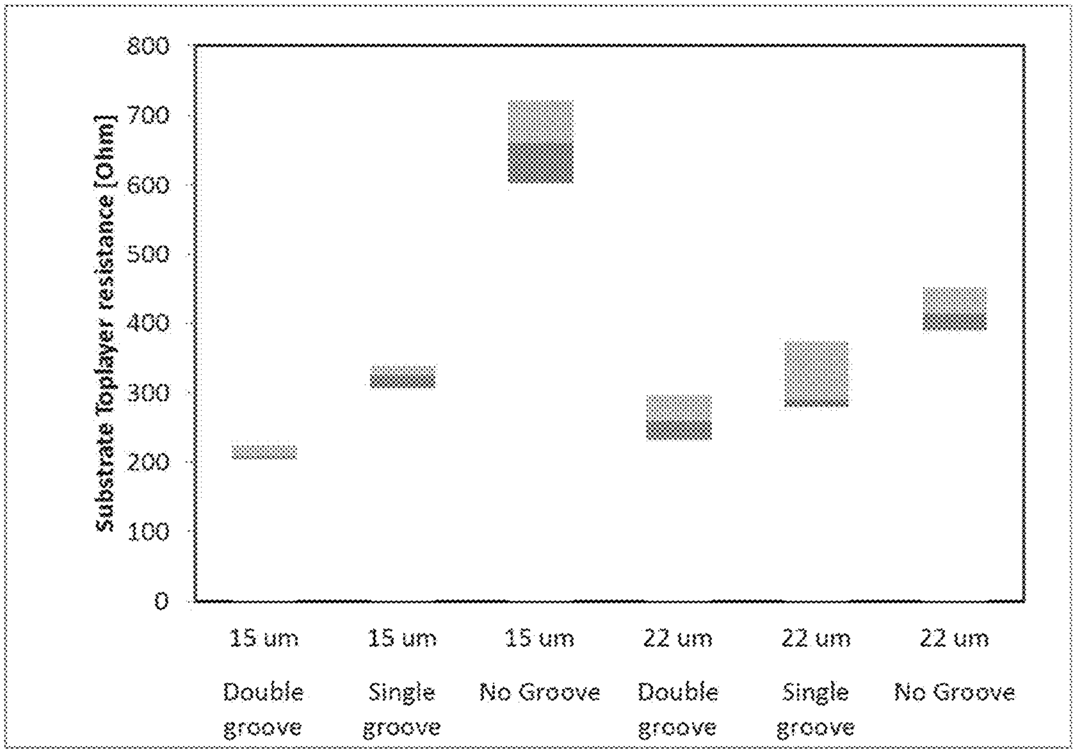
FIG. 8 shows a substrate top layer resistance which is a measure of the contact resistance between the first and second semiconductor layer, obtained with and without a method in accordance with embodiments of the present invention, for layered stacks with different thicknesses of the isolating connection layer.

The resistance values in FIG. 8 are in that case the sum of 2 groove resistances and the bulk resistance.

In an exemplary semiconductor device according to embodiments of the present invention wherein a thickness of the first semiconductor layer is 15 μm, a groove resistance for a groove all around the die between 75 and 100 Ohm is obtained.

In an exemplary semiconductor device according to embodiments of the present invention wherein a thickness of the first semiconductor layer is 22 μm, a groove resistance for a groove all around the die between 50 and 75 Ohm is obtained. For the first semiconductor layer with a thickness of 22 μm more power was used for laser grooving the grooves.

The results experimentally show that the resistance between substrate pads can be significantly reduced using a method in accordance with embodiments of the present invention. The resistance can even be lowered by more than a factor 2. The experiments also indicate that laser grooving in two direction results in a lower resistance between substrate pads than laser grooving in just one direction. The experiments also indicate that the resistance between substrate pads varies a lot less after laser grooving.

FIG. 8 shows the sum of 2 groove resistances and the bulk resistance for different singulated dies. From left to right the dies are obtained as follows:

- using a method in accordance with embodiments of the present invention, wherein a groove is lasered in two different directions through the first semiconductor layer and the isolating connection layer wherein the first semiconductor layer has a thickness of 15 μm;
- using a method in accordance with embodiments of the present invention, wherein a groove is lasered in a single directions through the first semiconductor layer and the isolating connection layer wherein the first semiconductor layer has a thickness of 15 μm;
- without laser grooving a groove wherein the first semiconductor layer has a thickness of 15 μm;
- using a method in accordance with embodiments of the present invention, wherein a groove is lasered in two different directions through the first semiconductor layer and the isolating connection layer wherein the first semiconductor layer has a thickness of 22 μm;
- using a method in accordance with embodiments of the present invention, wherein a groove is lasered in a single directions through the first semiconductor layer and the isolating connection layer wherein the first semiconductor layer has a thickness of 22 μm;
- without laser grooving a groove wherein the first semiconductor layer has a thickness of 22 μm;

It can be seen that the resistance between the first and second semiconductor layer for different singulated dies is smaller when applying a groove in accordance with embodiments of the present invention compared to a method where no groove is lasered. This is especially the case when applying grooves in two directions, which is the preferred embodiment.

It is therefore an advantage of devices according to embodiments of the present invention that their drift is reduced by electrically connecting the first semiconductor layer with the second semiconductor layer. Such devices may for example be sensors wherein the first semiconductor layer forms a membrane. Sensors with polysilicon shield and bonded membrane may be used.

A method for creating an electrical contact between semiconductor layers according to embodiments of the present invention can also be applied for connecting floating/isolated silicon regions on the edge of a die. Thus, a device in accordance with embodiments of the present invention is obtained. CMOS subcircuits on SOI are isolated by trenches filled with oxide, so called DTI, or Deep Trench Isolation. CMOS cells are then typically surrounded by such a deep trench isolation at the sides and the buried oxide (BOX) of the SOI wafer at the bottom and completely isolated from the base wafer and adjacent CMOS cells. As a result, at the periphery of the chip, outside the last trench, there is some silicon above the buried oxide of the SOI wafer that is isolated from everything, as one does not want to make an electrical connection between this outside silicon and the CMOS circuitry by a metal trace. That would give rise to injection of charges caused by ESD and EMC events from this outer silicon to the CMOS circuit. However, one does not want to have it floating as it can then charge over time. A method according to embodiments of the present invention by laser grooving through the first semiconductor layer 210 and the isolating connection layer 230 and partly in the second semiconductor layer 220 connects this electrically floating layer outside the last deep isolation trench to the base wafer without being connected to the CMOS circuitry inside the trenches.

Figure 9:
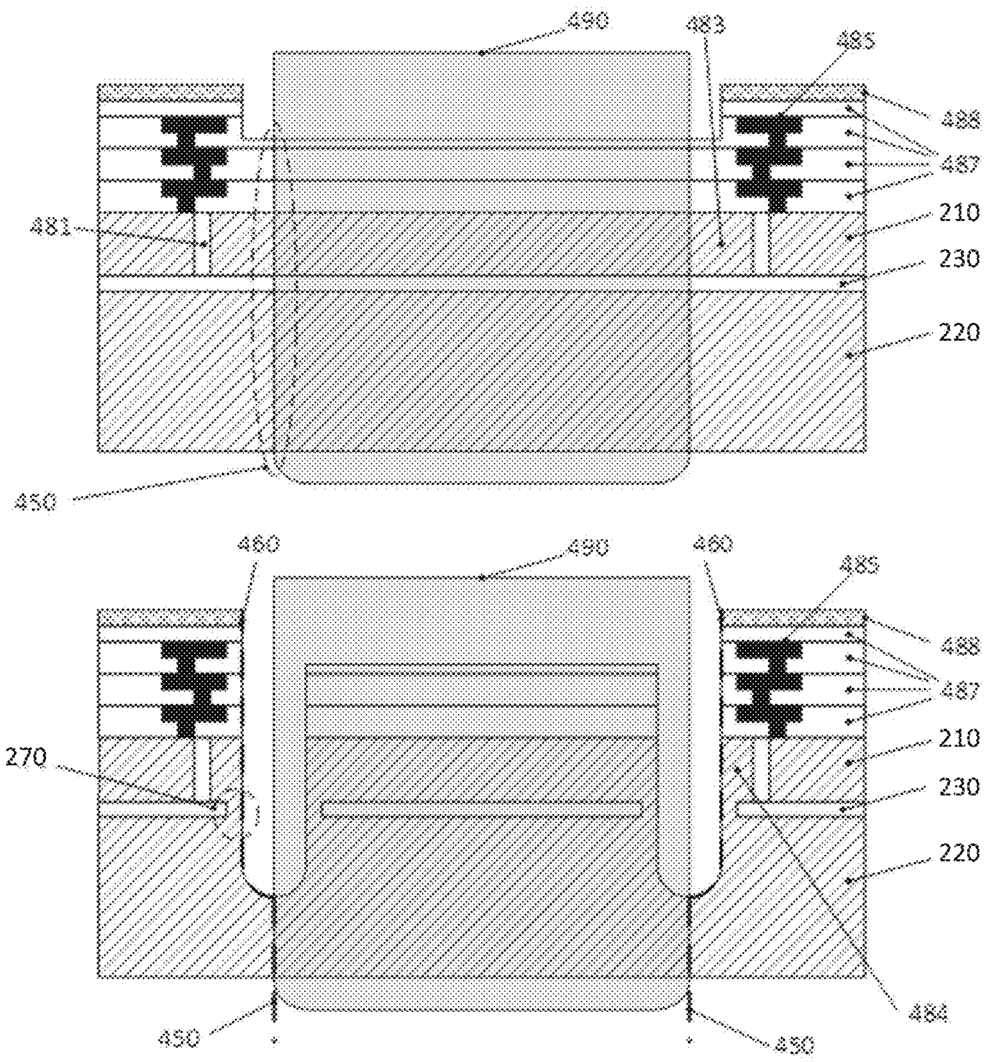
FIG. 9 shows schematic drawings of stacks for illustrating how floating/isolated silicon regions on the edge of a die can be electrically connected using a method in accordance with embodiments of the present invention.

Connecting floating/isolated silicon regions on the edge of a die using a method in accordance with embodiments of the present invention is illustrated by the schematic drawings of FIG. 9. The top drawing shows a schematic drawing of the stack before laser grooving and the bottom drawing shows a schematic drawing of the stack after laser grooving. The drawings show the first semiconductor layer 210, the isolating connection layer (e.g. oxide layer) 230 and the second semiconductor layer 220. The die edge which would be obtained by conventional die singulation is circled by the ellipse 450 in the top drawing and is illustrated by the dashed line 450 at the bottom of the bottom drawing. This bottom die edge in the bottom drawing is obtained by cutting the remainder of the second semiconductor layer. The upper die edge 460 is formed by laser grooving. The bottom drawing also shows the recrystallized conductive layer 270 over the isolating connection layer 230. The schematic drawings also show the trench isolation 481. In the top drawing the isolated silicon ring 483 around the chip in the first semiconductor layer is shown. In the bottom drawing the silicon ring 484 around the chip electrically connected to the second semiconductor layer is shown. Both drawings show a stack of CMOS metal layers 485 in seal ring, the passivation layer 487, the top passivation layer 488, and the Kerf which would be caused by conventional dicing.

The invention claimed is:

1. A method for creating an electrical contact between semiconductor layers which are separated by an isolating connection layer, the method comprising:

- providing a layered stack comprising at least a first semiconductor layer, an isolating connection layer, and a second semiconductor layer, wherein the isolating connection layer is between the first semiconductor layer and the second semiconductor layer,
- laser grooving at least one laser groove in the layered stack through the first semiconductor layer and the isolating connection layer and partly in the second semiconductor layer, thereby obtaining a recrystallized conductive layer at an edge of the layered stack, which connects the first semiconductor layer and the second semiconductor layer, wherein the recrystallized conductive layer is at least obtained from molten material of the first semiconductor layer, and wherein after the laser grooving a remainder of the second semiconductor layer is still present,
- cutting the remainder of the second semiconductor layer.

2. The method according to claim 1, wherein during the laser grooving the focal point of the laser is controlled such that laser grooving is done up to substantially a same depth as the depth of the isolating connection layer.

3. The method according to claim 1, wherein the first and second semiconductor layer of the provided layered stack are silicon layers, GaAs layers, SiC layers, GaN layers or a combination thereof.

4. The method according to claim 1, the method comprising doping the bonding surface of the first and/or the second semiconductor layer with an n-type or p-type dopant.

5. The method according to claim 1, wherein a thickness of the isolation connection layer of the provided layer stack is between 3 and 6 nm.

6. The method according to claim 1, wherein the laser grooving comprises forming at least two laser grooves, the at least two laser grooves being adjacent and wherein cutting the remainder of the second semiconductor layer is done between the adjacent laser grooves.

7. The method according to claim 6, wherein the laser grooving of the adjacent laser grooves is done such that in a pair of adjacent laser grooves the adjacent laser grooves are parallel.

8. The method according to claim 7, wherein the laser grooving of the adjacent laser grooves is done such that in a pair of adjacent laser grooves a distance between the adjacent laser grooves ranges between 0 and 60 μm.

9. The method according to claim 8, wherein the laser grooving is done in at least two passes.

10. The method according claim 1, wherein the laser grooving and the cutting is done in two different directions to singulate a plurality of semiconductor devices from the layered stack.

* * * * *